INVENTORS
ANDRE MÜLETHALER,
& WILLY ROHRBACH
BY
McNENNY, FARRINGTON, PEARNE, & GORDON

ATTORNEYS

United States Patent Office 3,494,252
Patented Feb. 10, 1970

3,494,252
ATTACHMENT FOR HOLDING THE BLANK OF A GEAR HOBBER
André Mühlethaler, Moutier, and Willy Rohrbach, Court, Switzerland, assignors to Fabrique de Machines André Bechler S.A., Moutier, Berne, Switzerland
Filed Aug. 26, 1968, Ser. No. 755,025
Claims priority, application Switzerland, Sept. 13, 1967, 12,760/67
Int. Cl. B23f 5/24
U.S. Cl. 90—4   12 Claims

ABSTRACT OF THE DISCLOSURE

The attachment has a plate that turns with the gear-hobber rotary table. A shaft concentric with the table rotates therewith and drives a first bevel gear. A first support, mounted on the plate by a ball-bearing, has two journals on which is mounted a second support free to rotate about an axis at right angles to the shaft. A second bevel gear, meshing with the first, is mounted on the second support free to rotate about the rotational axis of the second support; and a third bevel gear, meshing with the second, is keyed to the spindle for the gear blank.

BACKGROUND OF THE INVENTION

The invention relates to an attachment for holding the blank of a gear hobber that cuts or grinds teeth in the blank, the hobber having an arbor for the work tool, a rotary table, and a drive connected between the table and arbor for rotating the former.

Known hobbers of this kind are intended for the production of spur gears. It would be most advantageous if they also could produce bevel gears by the simple addition of an attachment.

SUMMARY OF THE INVENTION

The purpose of the invention is to obtain an attachment that, replacing the blank holder for making spur gears, is mounted on the hobber, whereby bevel gears, as well as spur gears, can be produced.

BRIEF DESCRIPTION OF THE DRAWING

The invention will be described in detail, with reference to the figures of the drawings, wherein.

DESCRIPTION OF THE PREFERRED EMBODIMENT

Figure 1:
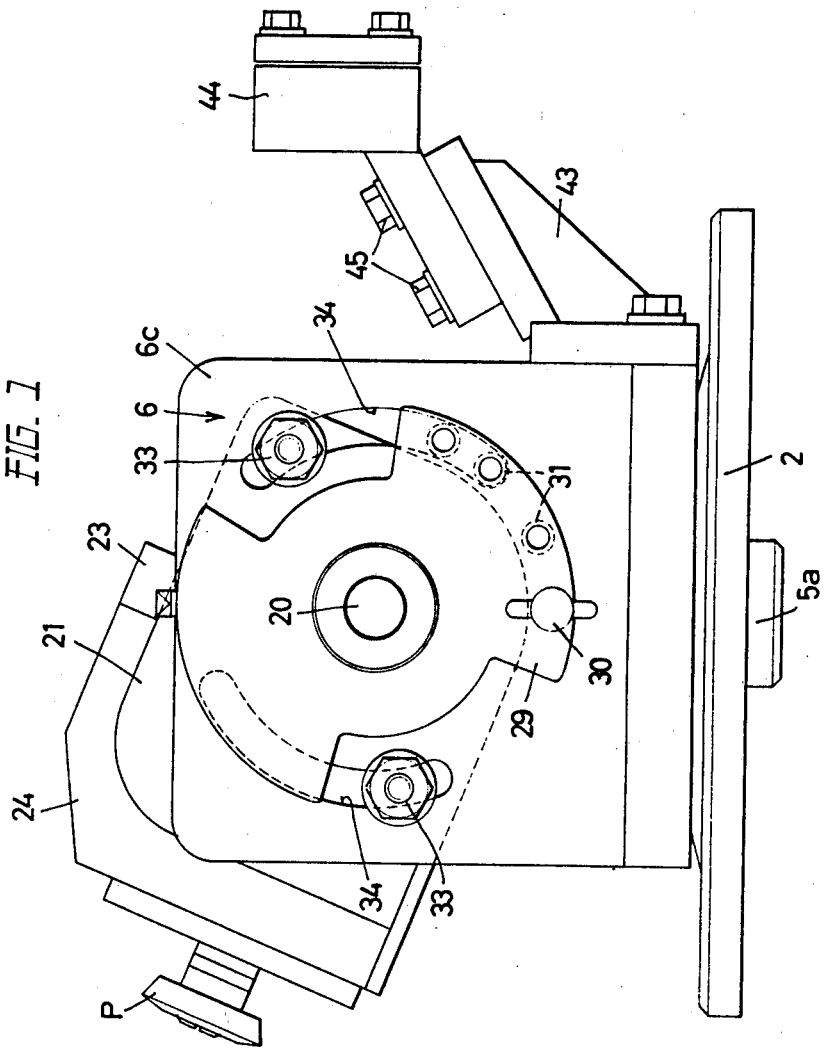
FIG. 1 is a side view of the attachment of the invention.
Figure 2:
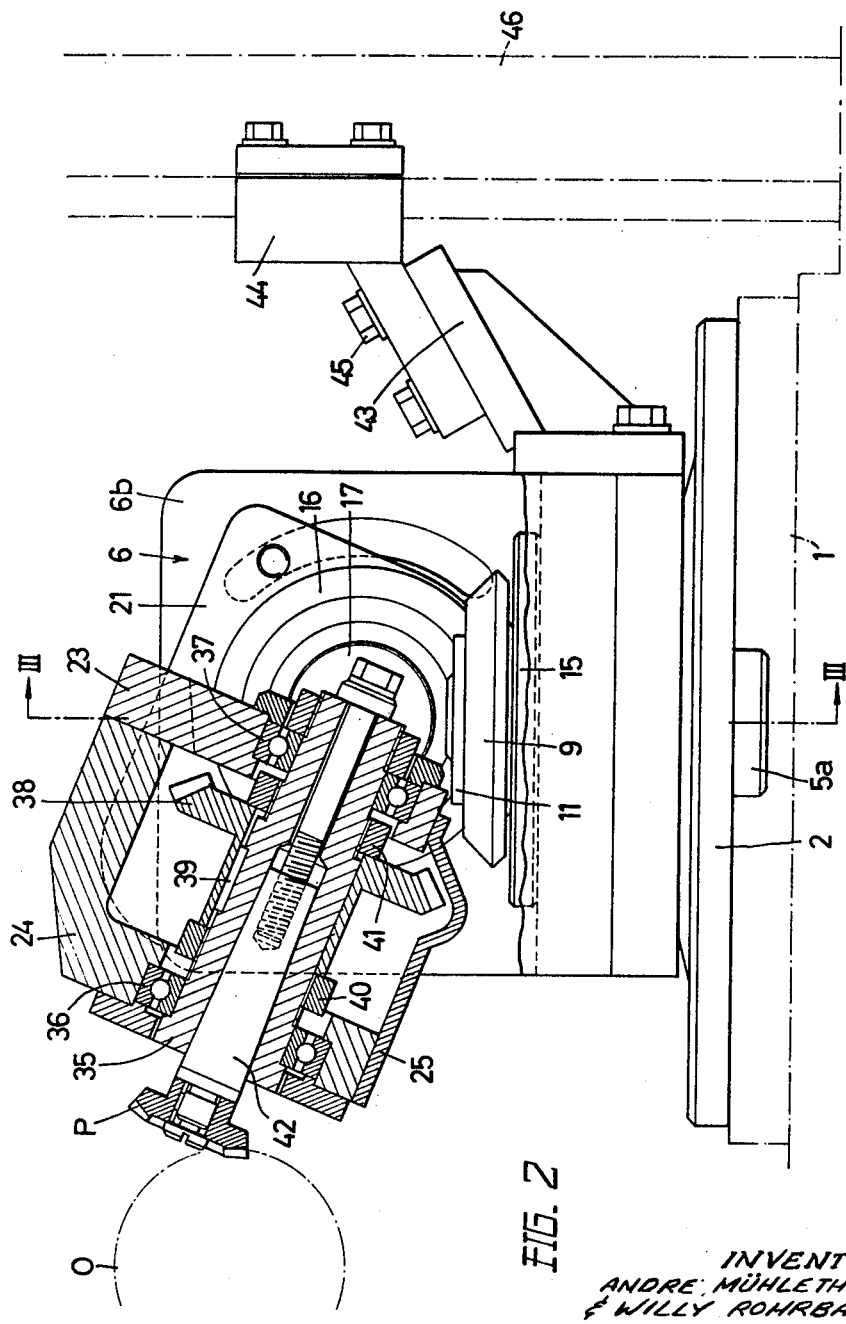
FIG. 2 is a view of the same side as that shown in FIG. 1, but partly in section taken along a plane passing through the spindle for holding the gear blank.
Figure 3:
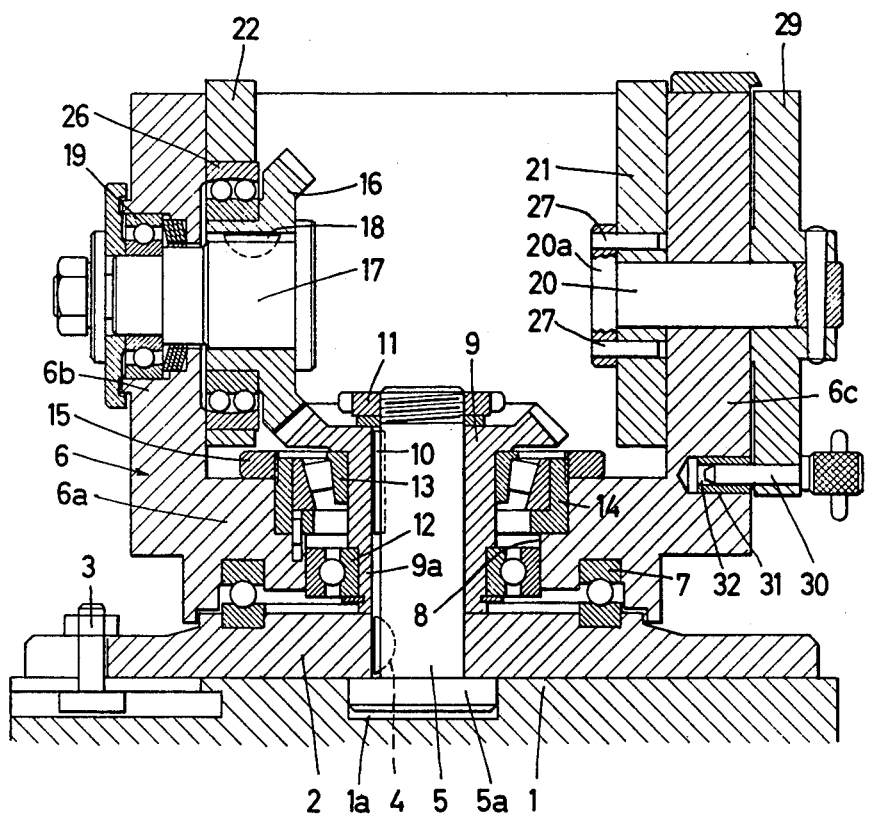
FIG. 3 is a view in section taken along line III—III of FIG. 2.

With reference to the figures, FIGS. 2 and 3 show a rotary table 1 that mounts and turns a workpiece holder. The table forms a part of a machine tool of known construction which is fitted to hob spur gears by cutting or grinding, the table being driven by a work-tool arbor through change gears. The attachment of the invention includes a disk plate 2 which can be secured to the rotary table 1, coaxially with respect to the latter, by means of screw bolts 3, for example. A shaft 5 is keyed to the plate 2 by a key 4, the lower shaft end 5a being located within a central recess 1a of the rotary table, for the purpose of centering the attachment before the nuts of the screw bolts 3 are turned home.

The attachment further incorporates a first support 6, of which the base part 6a is mounted on the plate 2 by a ball-bearing 7, in order that the support 6 is free to turn with respect to the plate. The support-base part 6a embodies a central, stepped bore 8, into which the shaft 5 coaxially extends. A first bevel gear 9 is keyed and fastened to the latter by a key 10 and a nut 11, respectively. A ball-bearing 12 and a conical-roller bearing 13 are mounted between the hub 9a of the bevel gear 9 and the support-base part 6a. A ring 14 is provided between the support-base part and the outer race of the conical-roller bearing 13. The ring has a nut 15, for axially adjusting the position of the ring, in order to reduce to a minimum the back lash between the first bevel gear 9 and a second bevel gear 16. This second bevel gear is keyed by a key 18 to a stub shaft 17, which is mounted by a ball-bearing 19 in one, 6b, of the two diametrically opposite solid-journal bearings 6b and 6c that project upwards from the support-base part 6a. The axis of rotation of the stub shaft 17 and the second bevel gear 16 coincides with that of a trunnion 20 mounted free to rotate in a bore of the solid-journal bearing 6c. This common axis is at right angles to the axis of rotation of the shaft 5, the plate 2, and the bevel gear 9.

The attachment incorporates a second support comprised of two side plates 21 and 22, a cross plate 23, and members 24 and 25, and means, such as screws, for connecting together the parts 21 to 25. This second support is mounted on the first support 6 free to rotate about the common axis of the stub shaft 17 and the trunnion 20, since the side plate 22 is mounted on the hub of the bevel gear 16 by means of a ball-bearing 26 and since the side plate 21 is rigid with the trunnion 20. The latter embodies a head 20a fixed rotationally to the side plate 21 by pins 27. A pin 28 fixes the outer end of the trunnion 20 to a plate 29. A locking pin 30 is axially movable in a hole located near the edge of the plate 29. The locking pin can be inserted into one of several sleeves 31 fixed in blind holes 32 embodied in the solid-journal bearing 6c along an arc, of which the center coincides with the common axis of the stub shaft 17 and the trunnion 20. The locking pin 30 facilitates the angular positioning of the second support with respect to the first support 6. After the locking pin 30 has been inserted into one of the sleeves 31, the two supports can be clamped together by tightening down the nuts of the bolts 33, which latter extend through respective holes in the side plate 21 and an arc-shaped slot 34 in the solid-journal bearing 6c.

A hollow spindle 35 for carrying the workpiece P is mounted in the second support free to rotate, but not to move axially, by ball bearings 36 and 37. The spindle carries a third bevel gear 38 of which the hub is keyed to the spindle by a key 39. The second and third bevel gears mesh. In order to reduce appreciably the back lash between the bevel gears 16 and 38, the latter gear can be moved axially by adjusting the nuts 40 and 41 screwed onto the external threads of the spindle 35. The spindle rotates about an axis at right angles to the common axis of the stub shaft and trunnion.

The three bevel gears 9, 16 and 38 all have the same number of teeth. Consequently, the workpiece spindle 35, and the workpiece P, which is mounted on the spindle by any suitable and known arrangement having a mandrel, are always rotated at the same rim as the rotary table 1, so that the work of the machinist when tooling is simplified.

The first support 6 is provided with an arrangement comprised of the parts 43 and 44, which are relatively adjustable along an inclined plane and fastened together by bolts 45. The arrangement permits the support 6 to be secured to an upwardly extending frame part 46 of the machine tool, in order to prevent the support from rotating.

When tooling, the machinist tilts the second support at the desired angle, which depends on the conicity of the gear teeth made in the gear blank P by the tool O. As the machining proceeds, the two supports remain stationary, whereas the plate 2 turns with the rotary table 1, so that the workpiece P is turned, via the bevel gears 9, 16 and 38 and the workpiece spindle 35, at the same r.p.m. as the table 1.

What is claimed is:

1. An attachment for holding and adjusting the angular position of a blank on a gear hobber to enable the hobber to produce bevel, as well as spur gears, the hobber having an arbor for a gear-forming tool, a rotary table, and a drive connection between the latter and said arbor for rotating said table, and the attachment includes:
   a plate adapted to be rigidly mounted coaxially on said rotary table, and a shaft connected to said plate for rotation therewith when said rotary table is driven;
   a first support, a base part incorporated by said first support and mounted on said plate, means associated with said first support and plate to permit relative rotation therebetween, a central bore in said first-support base part for accepting said shaft which is positioned coaxially with respect to said bore, means associated with said first support for preventing the latter from rotating when said rotary table is driven, two spaced bearing members that project upwards from said first-support base part at opposite positions thereof, a bore in each of said bearing members, said two bearing-member bores defining a common axis that is at right angles to that of said shaft and plate;
   a second support mounted on said two bearing members free to rotate about said common axis, and means for securing said second support in any one of a plurality of angular positions about said common axis;
   a spindle for carrying a gear blank, and means for mounting said spindle on said second support free to rotate about an axis at right angles to said common axis; and
   a first gear mounted on said shaft to rotate therewith, a second gear mounted on one of said two bearing members free to rotate about said common axis and meshing with said first gear, and a third gear meshing with said second gear and connected to said spindle to rotate the latter when said rotary table is driven.

2. The attachment as defined in claim 1, wherein said first, second, and third gears all have the same number of teeth.

3. The attachment as defined in claim 2, wherein said first, second, and third gears are bevel gears.

4. The attachment as defined in claim 1, wherein said two bearing members are solid-journal bearings.

5. The attachment as defined in claim 1, wherein said means associated with said first support includes further means for adjusting its length and securing it to a stationary part of the gear hobber.

6. The attachment as defined in claim 1, wherein said means permitting relative rotation include a ball-bearing for mounting said first-support base part on said plate.

7. The attachment as defined in claim 1, wherein said means permitting relative rotation include a ball-bearing mounted between said shaft and first-support base part to permit relative rotation therebetween.

8. The attachment as defined in claim 7, wherein said first gear includes a hub surrounding said shaft, and said ball-bearing is located between said gear hub and first-support base part.

9. The attachment as defined in claim 1, wherein said means permitting relative rotation include a conical-roller bearing mounted between said shaft and first-support base part to permit relative rotation therebetween.

10. The attachment as defined in claim 9, wherein said first gear includes a hub surrounding said shaft, and said conical-roller bearing is located between said gear hub and first-support base part.

11. The attachment as defined in claim 1, including a ball-bearing for mounting said second gear free to rotate.

12. The attachment as defined in claim 1, wherein said common axis of said shaft and plate, and the axis about which said spindle rotates are mutually right-angled.

References Cited

UNITED STATES PATENTS

| | | | |
|---|---|---|---|
| 2,064,806 | 12/1936 | Warner | 90—4 |
| 2,473,709 | 6/1949 | Hitchcock | 90—4 |
| 3,066,456 | 12/1962 | Ramage | 51—237 |

FOREIGN PATENTS 629,317  11/1927  France.

GIL WEIDENFELD, Primary Examiner

U.S. Cl. X.R.

51—105, 237; 90—1